US012212950B2

(12) United States Patent
Solvang

(10) Patent No.: US 12,212,950 B2
(45) Date of Patent: Jan. 28, 2025

(54) WIRELESS MICROPHONE WITH LOCAL STORAGE

(71) Applicant: Nomono AS, Trondheim (NO)

(72) Inventor: Audun Solvang, Trondheim (NO)

(73) Assignee: Nomono AS, Trondheim (NO)

(*) Notice: Subject to any disclaimer, the term of this patent is extended or adjusted under 35 U.S.C. 154(b) by 215 days.

(21) Appl. No.: 17/786,916

(22) PCT Filed: Dec. 17, 2020

(86) PCT No.: PCT/NO2020/050320
§ 371 (c)(1),
(2) Date: Jun. 17, 2022

(87) PCT Pub. No.: WO2021/125975
PCT Pub. Date: Jun. 24, 2021

(65) Prior Publication Data

US 2023/0353967 A1 Nov. 2, 2023

(30) Foreign Application Priority Data

Dec. 19, 2019 (GB) ..................................... 1918882

(51) Int. Cl.
*H04S 7/00* (2006.01)
*H04R 1/32* (2006.01)

(52) U.S. Cl.
CPC ............... *H04S 7/30* (2013.01); *H04R 1/326* (2013.01); *H04R 2201/40* (2013.01); *H04R 2420/07* (2013.01); *H04S 2400/15* (2013.01)

(58) Field of Classification Search
CPC . G06F 3/165; G06F 3/16; G06F 3/167; G08B 21/24; G10L 19/008;
(Continued)

(56) References Cited

U.S. PATENT DOCUMENTS 8,355,509 B2 * 1/2013 Faller .................... G10L 19/008 381/23
9,031,257 B2 * 5/2015 Sorensen .................. G01S 3/86 381/91

(Continued)

FOREIGN PATENT DOCUMENTS

CN 106093864 A 11/2016
GB 2562518 A 11/2018

(Continued)

OTHER PUBLICATIONS

Search Report issued in corresponding GB Application No. GB1918882.0 dated Aug. 24, 2020.

(Continued)

*Primary Examiner* — Gerald Gauthier
(74) *Attorney, Agent, or Firm* — Shook, Hardy & Bacon L.L.P.

(57) ABSTRACT

An apparatus with a base unit comprising a microphone array arranged to capture a plurality of local audio signals for producing a spatially encoded sound-field signal, and a remote microphone device with a microphone and an associated storage portion, wherein the remote microphone device is arranged to capture a remote audio signal associated with a sound source with the microphone and store said remote audio signal in the associated storage portion. The apparatus is further arranged to use the plurality of local audio signals to produce a spatially encoded sound-field signal with a plurality of components, determine a position of the remote microphone device, and generate a spatially encoded soundtrack using the spatially encoded sound-field signal and the stored remote audio signal in accordance with the determined position of the remote microphone device.

16 Claims, 6 Drawing Sheets

(58) Field of Classification Search

CPC ......... G10L 2021/02165; G10L 19/038; G10L 19/167; H04H 20/89; H04R 1/1083; H04R 1/326; H04R 3/005; H04R 3/02; H04R 5/04; H04R 2201/40; H04R 2420/07; H04R 1/1091; H04R 5/027; H04S 3/008; H04S 7/00; H04S 7/30; H04S 7/305; H04S 7/307; H04S 2400/11; H04S 2400/15; H04S 1/002; H04S 3/002; H04S 7/301; G01S 3/86; G06T 7/20; G10H 1/0091

See application file for complete search history.

(56) References Cited

U.S. PATENT DOCUMENTS

| | | | | |
|---|---|---|---|---|
| 9,430,931 | B1* | 8/2016 | Liu | G08B 21/24 |
| 10,971,130 | B1* | 4/2021 | Amengual Gari | H04R 3/005 |
| 11,388,512 | B2* | 7/2022 | Solvang | H04R 3/005 |
| 2002/0151997 | A1* | 10/2002 | Wilcock | G06F 3/167 |
| 2003/0087667 | A1 | 5/2003 | Taniguchi et al. | |
| 2004/0213419 | A1* | 10/2004 | Varma | H04R 3/005 381/71.11 |
| 2006/0206221 | A1* | 9/2006 | Metcalf | G10H 1/0091 381/119 |
| 2011/0153043 | A1* | 6/2011 | Ojala | H04S 3/002 700/94 |
| 2011/0153044 | A1* | 6/2011 | Lindahl | G06F 3/167 700/94 |
| 2011/0196522 | A1* | 8/2011 | Zakirov | H04S 7/305 700/94 |
| 2012/0123573 | A1* | 5/2012 | Goldstein | H04R 1/1091 700/94 |
| 2013/0066453 | A1* | 3/2013 | Seefeldt | H04S 7/301 700/94 |
| 2013/0124081 | A1 | 5/2013 | Khosravy et al. | |
| 2013/0148812 | A1* | 6/2013 | Corteel | H04R 5/04 381/17 |
| 2013/0246077 | A1* | 9/2013 | Riedmiller | G10L 19/167 704/500 |
| 2014/0358266 | A1* | 12/2014 | Peters | G10L 19/038 700/94 |
| 2015/0057779 | A1* | 2/2015 | Saungsomboon | G06F 3/16 700/94 |
| 2015/0286463 | A1* | 10/2015 | Asada | G06F 3/165 700/94 |
| 2016/0035386 | A1* | 2/2016 | Morrell | H04H 20/89 700/94 |
| 2017/0195793 | A1 | 7/2017 | Vilermo et al. | |
| 2018/0091915 | A1* | 3/2018 | Eronen | H04S 7/307 |
| 2018/0199137 | A1 | 7/2018 | Mate et al. | |
| 2018/0206038 | A1* | 7/2018 | Tengelsen | H04R 3/005 |
| 2018/0317006 | A1* | 11/2018 | Heimbigner | H04R 3/02 |
| 2019/0313200 | A1* | 10/2019 | Stein | H04S 3/008 |
| 2020/0396537 | A1* | 12/2020 | Solvang | G06T 7/20 |
| 2021/0084407 | A1* | 3/2021 | Jensen | H04R 1/1083 |
| 2023/0156419 | A1* | 5/2023 | Solvang | H04R 5/027 381/92 |
| 2023/0353967 | A1* | 11/2023 | Solvang | H04R 1/326 |

FOREIGN PATENT DOCUMENTS

| | | | |
|---|---|---|---|
| GB | 2567244 | A | 4/2019 |
| WO | 17182714 | A | 10/2017 |
| WO | 17182714 | A1 | 10/2017 |
| WO | 2018100233 | A | 6/2018 |
| WO | 2018100233 | A2 | 6/2018 |
| WO | 2018234628 | A | 12/2018 |
| WO | 2018234628 | A1 | 12/2018 |

OTHER PUBLICATIONS

International Search Report issued in corresponding International Application No. PCT/NO2020/050320 dated Mar. 10, 2021.

Tepper Allan: “Sennheiser Memory Mic: the “wireless” mic/body recorder review”, ProVideo Coalition, Nov. 20, 2018 (Nov. 20, 2018), XP055778632, Retrieved from the Internet: URL:https:/www.provideocoalition.com/sennheiser-memory-mic-the-wireless-micbody-recorder-review/[retrieved on Feb. 23, 2021] the whole document.

Foreman Chris: “Review: Mikme pocket wireless microphone with audio sync: Digital Photography Review”, https://www.dpreview.com/, Sep. 1, 2019 (Sep. 1, 2019), XP055778634, Retrieved from the Internet: URL:https://www.dpreview.com/reviews/review-mikme-pocket-wireless-microphone-with-audio-sync [retrieved on Feb. 23, 2021] the whole document.

* cited by examiner

WIRELESS MICROPHONE WITH LOCAL STORAGE

CROSS-REFERENCE TO RELATED APPLICATIONS

This application is a 35 U.S.C. § 371 National Phase of PCT Application No. PCT/NO2020/050320, filed Dec. 17, 2020, which claims priority to United Kingdom Application No19188820.0, filed Dec. 19, 2019, the disclosures of each of which are incorporated herein by reference in their entirety.

The present application relates to wireless microphones, such as those suitable for use in sound field recording systems and/or audio-object based productions.

Sound-field (also referred to as spatial audio) formats (e.g. Ambisonics, Dolby Atmos™, Auro-3D™, DTS:X™) provide a method of storing spatially encoded sound information relating to a given sound scene. In other words, they provide a way of assigning position information to sound sources within a sound scene to produce a spatially encoded soundtrack. In some productions, the sound information making up the spatially-encoded soundtrack is recorded separately (e.g. with separate conventional microphones), and position information for each sound source is then manually ascribed during post-production (e.g. when creating a computer generated video game sound scene). Alternatively, a spatially-encoded soundtrack may be captured partially or entirely live, e.g. using a multidirectional sound-field microphone array (e.g. an Ambisonic microphone array) which natively encodes captured audio with position/direction information. Capturing live "sound-field" data has been typically used to make conventional sound recordings more immersive (e.g. by creating the illusion of sitting amongst an orchestra), but more recently the technology has begun to be applied to other productions, such as virtual reality productions.

Sound-field microphones, whilst a useful tool for capturing live sound field information from a particular point in space, do have some limitations in terms of the quality and flexibility of their output. When recording a sound-field production, an audio engineer is typically interested in capturing two types of sounds; sound emitted by objects that tells the story and ambient sound that creates context for the story. Ambient audio can be easily captured with a single sound-field microphone array, but the quality of audio from sound sources positioned a large distance away from this microphone array may be significantly diminished. It is also difficult to isolate a single sound source within a sound field recording for the purposes of adding effects or adjusting levels. In some productions separate close microphones (e.g. boom, shotgun, lavalier, lapel or spot mics) are used to capture separately higher-quality audio of each sound source, but the audio captured (e.g. single channel audio with no position or direction information) can be difficult to integrate into the spatially encoded soundtrack. The present application seeks to mitigate at least some of these problems.

From a first aspect of the present invention there is provided a sound capture apparatus comprising:

a base unit comprising a microphone array arranged to produce a spatially encoded sound-field signal comprising a plurality of components;

a remote microphone device comprising a microphone and an associated storage portion, wherein the remote microphone device is arranged to capture a remote audio signal associated with a sound source with the microphone and store said remote audio signal in the associated storage portion;

wherein the apparatus is arranged to:

determine a position of the remote microphone device; and generate a spatially encoded soundtrack using the spatially encoded sound-field signal and the stored remote audio signal in accordance with the determined position of the remote microphone device.

Thus it will be seen by those skilled in the art that the remote audio signal may be captured with the remote microphone device which may enable sound from the sound source to be captured at a higher quality and/or level of isolation than would be possible using only the microphone array of the base unit. For example, the remote microphone device may be placed in close proximity to the sound source (i.e. closer to the sound source than the base unit), increasing the amplitude of sound from the sound source relative to background noise and/or other sound sources. The use of a remote microphone device may thus increase the signal-to-noise ratio of the remote audio signal and can also improve the isolation of one sound source in the remote audio signal by reducing cross talk.

Storing the remote audio signal in the associated storage portion of the remote microphone device (rather than, for example, just transmitting the remote audio signal wirelessly to the base unit and storing it there) means that the quality of the remote audio signal is not limited by transmission bandwidth. A higher quality remote audio signal may enable a higher quality spatially encoded soundtrack to be generated and in some embodiments may also improve the accuracy with which the position of the remote microphone device may be determined. The remote microphone device may be arranged to store the remote audio signal with little or no compression applied thereto (e.g. as an uncompressed audio signal).

Storing the remote audio signal in the associated storage portion of the remote microphone device also avoids the risk of losing the audio signal entirely if a transmission channel fails (e.g. due to loss of radio connection due to poor signal strength or interference). Furthermore, because the remote audio signal is stored locally, the remote microphone device may not need to operate real-time transmission (e.g. a wireless radio module) all the time, which may reduce energy consumption. In some embodiments the remote microphone device may be battery powered, and reduced energy consumption may consequently improve battery life. The remote microphone device may not even include real-time transmission means at all, reducing the complexity and cost of the apparatus.

In some embodiments, the apparatus may be arranged to determine the position of the remote microphone device by comparing the stored remote audio signal with the plurality of components of the spatially encoded sound-field signal. For example, the apparatus may be arranged to compare the stored remote audio signal with each of the plurality of components to determine a plurality of comparison results (e.g. a plurality of measures of correlation such as cross spectra), and to use the plurality of comparison results to determine the position of the remote microphone device. For example, the apparatus may be arranged to calculate the relative magnitude of the cross spectrum between the stored remote audio signal and each of the components.

The apparatus may be arranged to determine a relative orientation between the remote microphone device and the microphone array (or, in relevant embodiments, other remove microphone devices) based on analysis of changes in frequency response between the remote microphone device and the microphone array (or pairs of remote microphone devices).

In some embodiments, the determined comparison results may be used to calculate one or more propagation delays between the stored remote audio signal and at least one of the plurality of components (e.g. propagation delays between the remote audio signal and each of the plurality of components). In such embodiments, determining the position of the remote microphone device may comprise determining a direction and/or a distance from the base unit to the local microphone using the one or more propagation delays (e.g., using an average of the propagation delays, along with an estimate of the speed of sound).

In a set of embodiments the apparatus is arranged to perform post processing on the stored remote audio signal and the plurality of components incorporating an a priori model of a physical system describing the constraints in the position of the sound source, e.g. defining a horizontal plane in which the sound source must be located, a velocity and/or acceleration based on these objects most likely being human beings. Kalman or particle filters or machine learning frameworks such as Hidden Markov Models may be used as part of post processing.

In such embodiments, because the remote audio signal may be stored in the associated storage portion of the remote microphone device at a high quality (e.g. without compression), the remote audio signal may comprise more information (or more detailed information) to compare with the plurality of components of the spatially encoded sound-field signal, enabling more accurate positioning (and thus facilitating the production of a more accurate and more immersive spatially encoded soundtrack). The stored remote audio signal and the spatially encoded sound-field signal may be labelled with a time code to aid synchronisation when determining position and generating the soundtrack.

The present invention may be particularly applicable in scenarios in which the sound source is moving, as it can mitigate the requirement for labour intensive manual tracking of moving sound sources during production. In embodiments featuring a moving sound source, the remote microphone device is typically configured to move with the sound source, to ensure that the remote audio signal continues to correspond to sound from the sound source. This may be achieved by affixing or otherwise connecting the remote microphone device to the sound source. For example the sound source may comprise a talking person, and the remote microphone device may comprise a lavalier-type microphone clipped to an item of the person's clothing.

While the Applicant recognises that unambiguously determining position information in three dimensions may theoretically require the microphone array to comprise four or more microphones, the Applicant has appreciated that in many situations only two microphones may be sufficient to determine position sufficiently accurately. For example, additional information such as known physical limits to the position or movement of the sound source, or a known starting position in conjunction with tracking techniques, may be used to help resolve the position of the sound source. However in a set of embodiments the microphone array comprises at least three microphones, and in some such embodiments the microphone array comprises at least four microphones.

Preferably, the at least two microphones of the microphone array are adjacent each other, although in general they could be spaced apart from each other. The microphone array may comprise a plurality of microphones arranged mutually orthogonally, that is the respective axes for each microphone which have the greatest response are mutually orthogonal to one another.

In some embodiments, the remote microphone device and the base station are arranged to communicate over a wireless link (e.g. over a Radio Frequency (RF) connection such as a connection conforming to the Bluetooth™ or WiFi standards).

The remote microphone device may be arranged to transmit data to the base station over the wireless link. The data may comprise the remote audio signal, or a version of the remote audio signal (e.g. that has been compressed). Additionally or alternatively, the data may comprise metadata and/or status information such as a battery life, available storage space in the associated storage portion, or timing information.

Equally, the base unit may be arranged to transmit data to the remote microphone over the wireless link. For example, the base unit may be arranged to provide software and/or firmware updates to the remote microphone device over the wireless link (so-called "over-the-air" updates).

In some embodiments, the remote microphone device and the base unit may be arranged to communicate during capture of the remote audio signal. For example, the remote microphone device may be arranged to transmit the remote audio signal or a version (e.g. a compressed version at a lower bit-rate) of the remote audio signal to the base unit in real-time (or near real-time) to enable live monitoring of the recording. In some such embodiments, the apparatus may be arranged to use the transmitted remote audio signal to determine the position of the remote microphone device in real time (or near real-time). For instance, the compressed version of the remote audio signal transmitted to the base station may be compared to the plurality of components of the spatially encoded sound-field signal to determine a position of the remote microphone device whilst the audio capture is ongoing. Although the transmitted signal may be of lower quality (e.g. due to being compressed) than that stored in the storage portion, it may still be possible to determine the position of the remote microphone device in real time with a lower accuracy, which can still be very useful for monitoring purposes.

The remote microphone device may be arranged to transmit other information (e.g. metadata, battery life, storage space, timing information) during audio capture to aid monitoring of the remote microphone device itself.

In some embodiments, the remote microphone device may be arranged to transmit the remote audio signal (i.e. the signal stored in the associated storage portion) to the base unit over the wireless link in non-real time (e.g. with a delay or even after audio capture has been completed). This may be convenient where it is not possible (e.g. due to limited bandwidth) to transmit an uncompressed remote audio signal over the wireless link in real time, or in circumstances where parts of a version of the remote audio signal transmitted in real-time over the wireless link are lost (e.g. due to wireless interference). For example, the remote microphone device may be arranged to transmit a low bit-rate (compressed) version of the remote audio signal to the base unit over the wireless link with low delay (e.g. in real-time) and to transmit the full quality remote audio signal to the base unit over the wireless link at a later time (i.e. with a longer delay).

In some embodiments, the remote microphone device and base unit may be arranged to form a temporary wired connection (i.e. one that is only formed at certain times, e.g., when the remote microphone device is not capturing audio). For example, the remote microphone device and base unit may be arranged to be connected using a cable to form the temporary wired connection (e.g. a USB cable). In some embodiments, the remote microphone device may be arranged to dock directly with the base unit to form the temporary wired connection (i.e. without the need for a connection cable), which may be more convenient. For example, the base unit may comprise a first set of electrical contacts and the remote microphone device may comprise a second set of electrical contacts arranged to be brought into contact with the first set of electrical contacts to form the temporary wired connection.

The temporary wired connection may be used to transfer data from the remote microphone device to the base unit (or vice-versa). For example, the remote microphone device may be arranged to transfer the stored remote audio signal (e.g. an uncompressed, full quality remote audio signal stored in the associated storage portion) to the base unit over the temporary wired connection. A wired connection may be able to provide a higher communication bandwidth than a wireless connection, facilitating faster transfer speeds to those which may be possible over a wireless (e.g. RF) connection. The remote audio signal can thus be transmitted to the base unit quickly, which may be especially important for productions featuring long recordings (and thus large audio file sizes). A temporary wired connection may also consume less power than a wireless connection and may also require fewer and/or cheaper components. A wired connection is also less liable to interference than a wireless link.

The temporary wired connection may also (or instead) be used to transmit other information (e.g. metadata, battery life, available storage space, timing information) to or from the remote microphone device. In battery-powered embodiments, the temporary wired connection may be used to charge the battery of the remote microphone device.

In some embodiments, it may not be necessary to communicate the full stored remote audio signal (i.e. over a temporary wired connection or over a wireless link) to the base unit if part or a version of the remote audio signal has already been transmitted over a wireless link. In some embodiments, therefore, the remote microphone device is arranged to transmit a supplementary signal derived from the stored remote audio signal to the base unit over a temporary wired connection or over a wireless link.

For instance, it may be possible to retrieve all or most of the information from the original remote audio signal (i.e. to reconstruct the stored remote audio signal) by combining a compressed version of the remote audio signal with a supplementary signal derived from the stored remote audio signal that comprises only higher order information that may be absent from the compressed remote audio signal. Similarly, if the version of the remote audio signal that is transmitted over the wireless link is incomplete (e.g. because the wireless link was lost due to interference for part or parts of the recording time), it may be sufficient to transmit to the base unit a supplementary signal derived from the stored remote audio signal that comprises only the missing part(s) of the remote audio signal.

The apparatus may be arranged such that the forming or breaking of the temporary wired connection acts as a trigger to perform one or more actions. For example, the remote microphone device may be arranged to transmit the remote audio signal and/or other information to the base unit automatically when the temporary wire connection is formed (e.g. when the remote microphone device is docked with the base unit). The remote microphone device and the base unit may be arranged to synchronise clocks when the temporary wired connection is formed (to ensure recorded audio can be accurately synchronised). The forming of the temporary wired connection may trigger other actions, such as stopping or pausing audio recording (by the base unit and/or the remote microphone unit). Correspondingly, the breaking of the temporary wired connection may trigger audio recording to start.

In some embodiments, the storage portion of the remote microphone device comprises a removable storage device, such as a flash memory card. In some such embodiments the base unit may comprise a corresponding storage device reader (e.g. a memory card slot), allowing a user to transfer the stored remote audio signal (and any additional meta or status information) from the remote microphone device to the base unit simply by removing the removable storage device from the remote microphone device and providing it to the storage device reader (e.g. inserting it into a memory card slot).

In some sets of embodiments, the base unit may comprise a processor. The processor may be arranged to determine the position of the remote microphone device and/or to generate the spatially encoded soundtrack using the spatially encoded sound-field signal and the remote audio signal in accordance with the determined position of the remote microphone device. In such embodiments, no additional hardware and/or no internet connection may be required to determine the position of the remote microphone device and/or generate the spatially encoded soundtrack.

In some embodiments, the apparatus may comprise a separate processing device (i.e. separate to the base unit and remote microphone device) arranged to determine the position of the remote microphone device and/or generate the spatially encoded soundtrack. For example, this may comprise a separate computer system or a remote server (e.g. a cloud-based processing service). Using a separate processing device may enable the complexity, cost, size and/or power demand of the remote microphone device and/or the base unit to be minimised (as they may not need to provide significant processing capabilities), which may increase the convenience of the apparatus for some recoding situations. A separate processing device may also be upgraded and or adapted without needing to update the base unit or the remote microphone device. For instance, additional processing power may be added to the processing device (e.g. to speed up or improve positioning and/or soundtrack generation) without needing to implement hardware or software changes to the base unit. This may be particularly useful where the processing device is provided as part of a cloud-based processing service.

In some embodiments, the apparatus (e.g. the processor or separate processing device) may be arranged to process automatically the remote audio signal based at least partially on the determined position of the remote microphone device. For example, the apparatus may be arranged to suppress sound from the sound source appearing in the spatially encoded sound-field signal produced by the microphone array.

In some embodiments, the apparatus may comprise a monitoring device arranged to output information to a user. For example, the monitoring device may be arranged to output (e.g. via a display) information relating to the remote audio signal (e.g. amplitude, frequency response) or the spatially encoded sound-field signal. The monitoring device may be arranged to output information relating to the remote microphone device itself (e.g. battery life, available storage space). The monitoring device may be arranged to output the remote audio signal (or a compressed version of the remote audio signal), e.g. via a loudspeaker or via headphones. The monitoring device may be arranged to output the spatially encoded soundtrack (or a rough version of the spatially encoded soundtrack). The monitoring device may be arranged to output an indication of the position of the remote microphone device. The monitoring device may be integrated into the base unit or it may be a separate device (e.g. a smartphone) that is wirelessly connected to the base unit and/or remote microphone device.

The monitoring device may be arranged to output information during audio capture to facilitate live monitoring of the recording. A user may thus not have to wait for the (e.g. uncompressed) stored remote audio signal to be retrieved from the associated storage portion before they can assess the recording set-up and identify or troubleshoot any issues. Whilst the version of the remote audio signal/soundtrack may output be the monitoring device may not be of the same quality or accuracy as that generated after the recording (e.g. using an uncompressed remote audio signal), in many cases even a rough indication can be sufficient for a user to detect errors and/or ensure a high quality recording.

In some embodiments, the spatially encoded soundtrack comprises a separate audio channel for the remote audio signal. In some embodiments, the spatially encoded soundtrack is encoded according to a channel-based format (in which the audio tracks are directly linked to loudspeaker channels and configurations, e.g., 5.1 surround sound), a scene-based format (in which the audio tracks describe the sound field in a "sweet spot", e.g., Ambisonics) or an object-based format (in which audio tracks are linked to individual sound sources, with their position stored as meta-data). In a set of embodiments the soundtrack is encoded according to a Next Generation Audio (NGA) format or standard such as the audio definition model (ADM), Dolby Atmos® or MPEG-H formats.

In some embodiments, the sound capture apparatus may comprise a plurality of remote microphone devices, each comprising a microphone and an associated storage portion and arranged to capture a remote audio signal associated with a sound source with the microphone and store said additional remote audio signal in the associated storage portion. In some such embodiments the apparatus may be arranged to determine a position of each remote microphone device and to generate the spatially encoded soundtrack using the remote audio signals in accordance with the determined positions of the remote microphone devices.

From a second aspect of the present invention there is provided a method of generating a spatially encoded soundtrack using:

- a base unit comprising a microphone array; and
- a remote microphone device comprising a microphone and an associated storage portion; the method comprising
- producing a spatially encoded sound-field signal comprising a plurality of components using the microphone array;
- capturing a remote audio signal associated with a sound source with the microphone;
- storing said remote audio signal in the associated storage portion;
- determining a position of the remote microphone device; and
- generating a spatially encoded soundtrack using the spatially encoded sound-field signal and the remote audio signal in accordance with the determined position of the remote microphone device.

Features of any aspect or embodiment described herein may be applied wherever appropriate to any other aspect or embodiment described herein. Where reference is made to different embodiments or sets of embodiments, it should be understood that these are not necessarily distinct but may overlap.

Certain examples of the present invention will now be described, by way of example only, with reference to the accompanying drawings in which.

Figure 1:
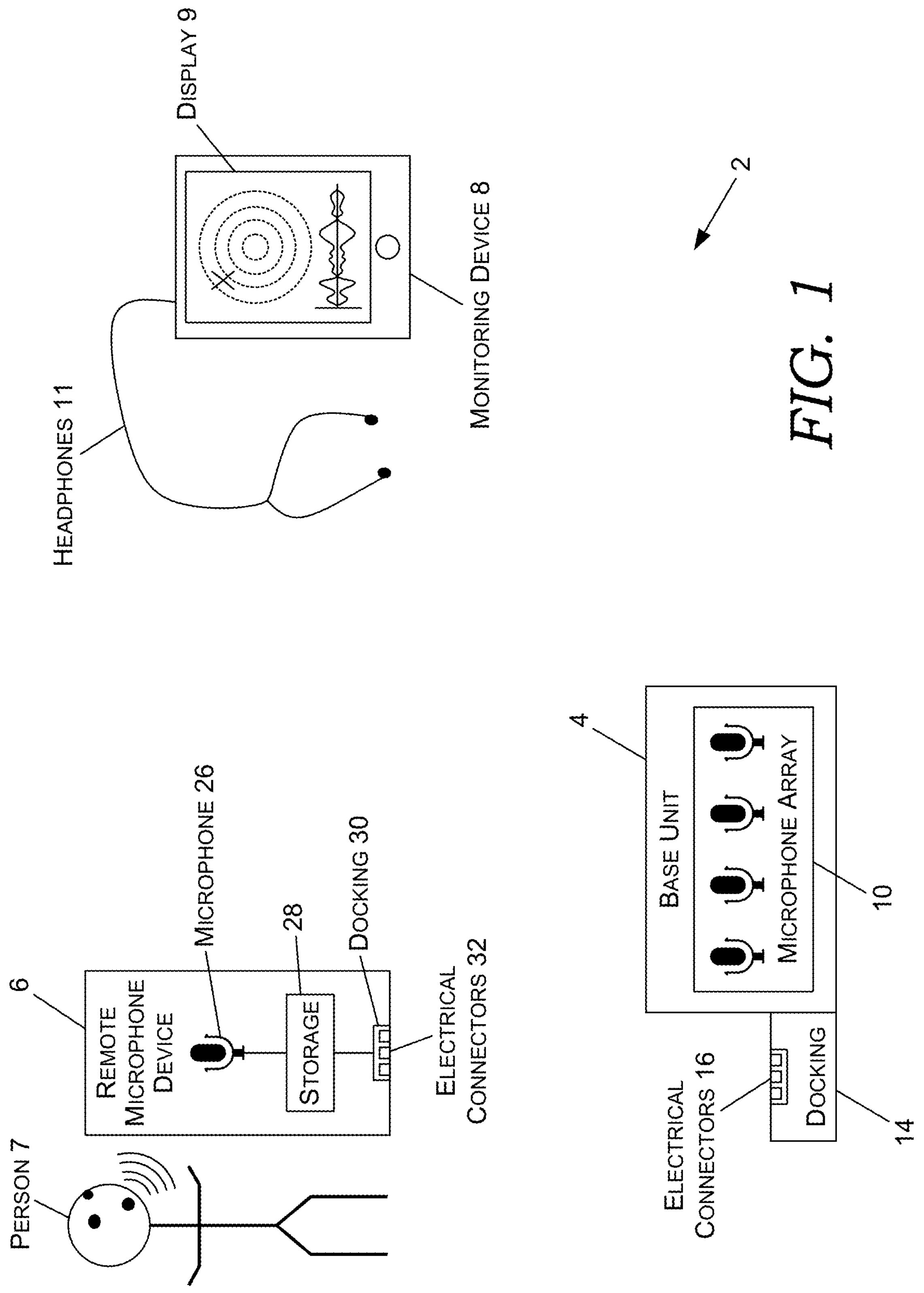
FIG. 1 is a schematic diagram of a sound capture apparatus during audio capture according to one embodiment of the present invention.

FIG. 1 shows schematically a sound capture apparatus 2 comprising a base unit 4, a remote microphone device 6, and a monitoring device 8 comprising a display 9, e.g. in the form of a tablet computer.

Figure 2:
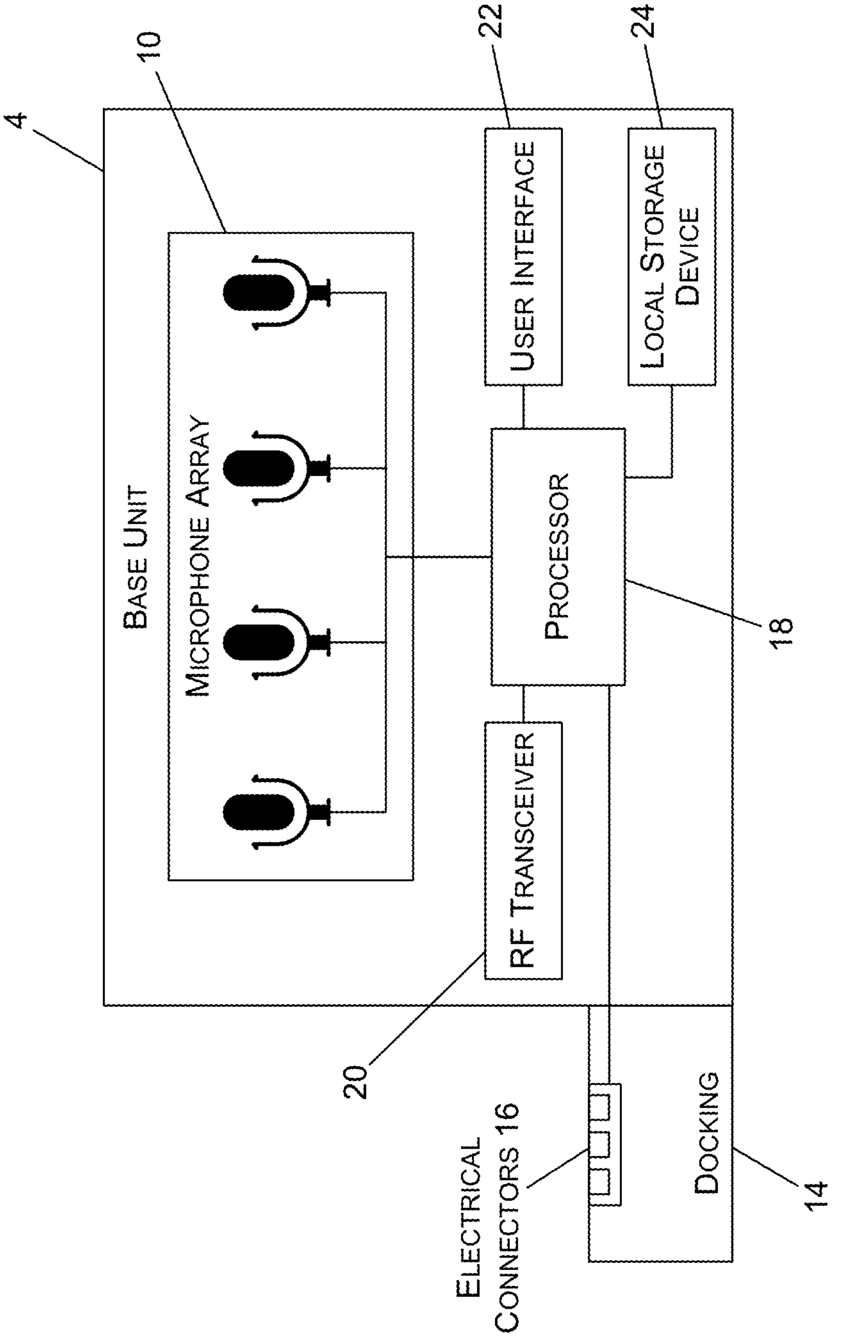
FIG. 2 is a more detailed schematic view of the base unit of FIG. 1.

The base unit 4 comprises a microphone array 10 comprising four microphones and a docking portion 14 comprising a first set of electrical connectors 16. Although the specific arrangement of the microphone array 10 is not shown in detail, the microphones of the microphone array 10 are arranged to capture sound arriving at the microphone array 10 from any direction. The position and orientation of each of the plurality of microphones is precisely chosen in advance. As shown in more detail in FIG. 2, the base unit further comprises a processor 18, an RF transceiver 20, a user interface 22 and a local storage device 24.

Figure 3:
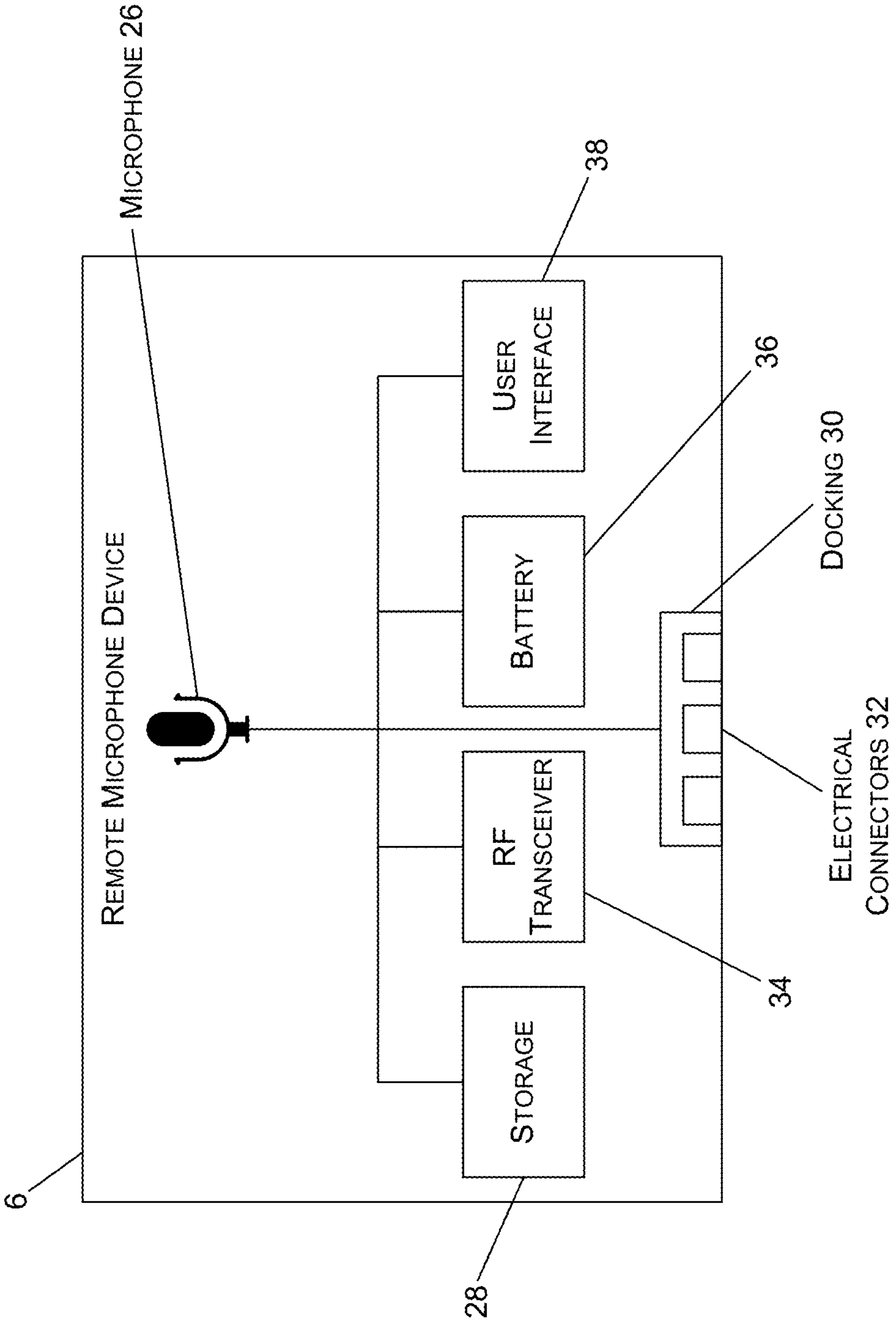
FIG. 3 is a more detailed schematic view of the remote microphone device of FIG. 1.

The remote microphone device 6 comprises a microphone 26, an associated storage portion 28 and a docking portion 30 comprising a second set of electrical connectors 32 adapted to mate with the first set of electrical connectors 16. As shown in more detail in FIG. 3, the remote microphone device 6 further comprises an RF transceiver 34, a battery 36 and a user interface 38. The microphone 26 is configured to output a single (mono) remote audio signal which is stored in the storage portion 28.

As explained in more detail below, the sound capture apparatus 2 may be used to produce a spatially encoded soundtrack of a sound scene, with individual sound sources being captured in high quality and with high spatial accuracy. The apparatus 2 also facilitates real-time monitoring of audio recording.

As shown in FIG. 1, the remote microphone device 6 is positioned near to a person 7 who is speaking and thus acts as a sound source within the sound scene. The sound scene also includes other sound sources (not shown in FIG. 1). The remote microphone device 6 is affixed to the clothing of the person 7 (e.g. as a discreet lavalier-type microphone) such that it remains near to the person 7 even if they move around.

As mentioned above, the microphone array 10 of the base unit 4 is arranged to capture sound arriving from any direction. The microphone array 10 thus captures sound from the person 7 along with other sound sources in the sound scene. From the sound captured by the microphone array 10, the processor 18 produces a spatially-encoded sound field signal comprising a plurality of components (e.g.

a plurality of Ambisonics A-format or B-format signals) including sound from all the sound sources in the scene.

However, due to the distance between the microphone array 10 and the person 7 and the consequently reduced signal-to-noise ratio, the sound quality with which speech from the person 7 is captured by the microphone array 10 may be poor.

The remote microphone device 6 captures a remote audio signal with the microphone 26 and stores the remote audio signal to the associated storage portion 28. As mentioned above, the remote microphone device 6 is positioned close to the person 7, the remote audio signal is thus dominated by sound from the first person 7 and a high signal-to-noise ratio can be achieved. The speech from the person 7 may therefore be captured with high quality by the remote microphone device 6. The remote microphone device 6 stores the remote audio signal to the associated storage portion 28 without any compression (i.e. in as high a quality as possible).

During audio capture, the sound capture apparatus 2 is arranged to facilitate real-time monitoring of the recording by a user with the monitoring device 8. This may enable the user to monitor conveniently many aspects of the recording without needing to wait for the stored remote audio signal to be retrieved from the associated storage portion 28. This may enable errors in set up (e.g. a microphone positioned incorrectly) to be identified sooner as well as enabling features such as audio signal levels or the actual audio content of the recording to be monitored conveniently in real-time.

To facilitate real-time monitoring, the remote microphone device 6 is arranged to transmit in real-time (or near real-time) a compressed version of the remote audio signal from the RF transceiver 34 of the remote microphone device to the RF transceiver 20 of the base unit 4 (as well as storing the original uncompressed version to the associated storage portion 28). The remote microphone device 6, may also transmit additional information that may be useful for monitoring purposes to the base unit 4, such as remaining battery life of the battery 36 or available storage space in the associated storage portion 28.

Using a process similar to that described in more detail below in relation to the stored remote audio signal, the processor 18 of the base unit 4 determines the current position of the remote microphone device 6 by comparing the received compressed version of the remote audio signal to the plurality of components of the spatially-encoded sound field signal. Whilst the compressed version of the remote audio signal has a lower bit rate (i.e. lower quality) than the original (that is stored in the associated storage portion 28), an estimate of the position can still be determined that may still be sufficiently accurate for monitoring purposes. The processor 18 also generates in real-time a spatially encoded soundtrack using the compressed version of the remote audio signal.

The compressed version of the remote audio signal, the determined position, the spatially encoded soundtrack and any additional information received from the remote microphone device 6 are then transmitted to the monitoring device 8 (e.g. via an unillustrated wireless network). The monitoring device 8 may then output information useful for monitoring purposes to a user.

Figure 4:
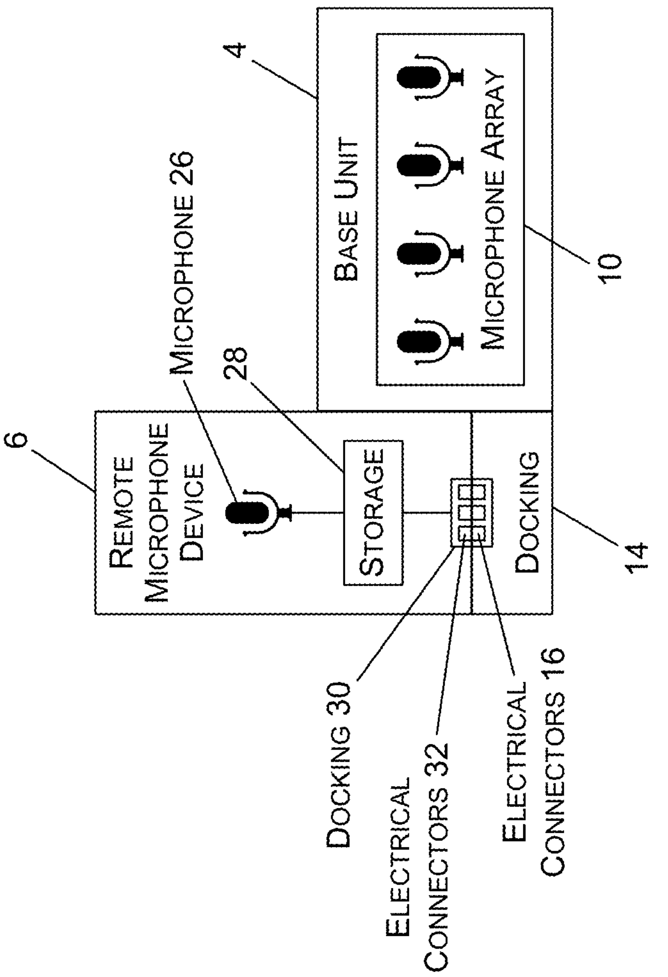
FIG. 4 is a schematic diagram of the sound capture apparatus in a docked configuration.

Once the recording is complete, the user places the remote microphone device 6 onto the docking portion 14 of the base unit 4 (as shown in FIG. 4), bringing the first and second set of electrical contacts 16, 32 into contact. This triggers the remote microphone device 4 and the base unit 6 to stop recording and to automatically transfer the (high quality) stored remote audio signal (that is stored in the associated storage portion 28 of the remote microphone device 6 to the local storage device 24 of the base unit 4. Alternatively, a supplementary signal comprising only components of the stored remote audio signal that are absent from the compressed version of the remote audio signal (that is transmitted wirelessly to the base unit 4) may be transferred from the remote microphone device 6) to the local storage device 24 of the base unit 4. The full quality remote audio signal may then be reconstructed by the base unit 4 by combining the compressed version and the supplementary signal.

The temporary wired connection provided by the first and second set of electrical contacts 16, 32 is also used to charge the battery 36 of the remote microphone unit.

Once the transfer is complete, the processor 18 of the base unit 4 compares the (full quality) remote audio signal with the plurality of components of the spatially-encoded sound field signal to determine the position (or positions, if the person moves during audio capture) of the remote microphone device 6 during the capture of the remote audio signal. Specific details of some possible approaches for doing so are explained below with reference to FIGS. 5 and 6. Because the remote audio signal is stored at a high quality (without compression), the processor 18 is able to accurately determine the position. Of course in other examples this processing may be performed by a separate processing device (such as a cloud-based processing service).

Using the determined position(s), the processor 18 generates a spatially encoded soundtrack that incorporates the remote audio signal (i.e. including the high quality recording of the person's 7 speech) into the sound-field signal captured by the microphone array 10.

Once the remote audio signal has been transferred to the base unit 4, the remote microphone device 6 may be removed from the docking portion 14 of the base unit 4 to perform another recording. Disconnecting the first and second set of electrical contacts 16, 32 may automatically trigger recording to begin again, although alternatively the user interface 22 of the base unit 4 and/or the user interface 38 of the remote microphone device 6 may be used to start/stop recordings.

In FIG. 1, the monitoring device 8 is shown outputting a visual indication of the position of the remote microphone device 6, and a visual representation of the remote audio signal on the display 9. Of course other information may also (or instead) be output on the display 9 (e.g. according to user selection), such as a visual representation of the spatially encoded soundtrack or additional information (e.g. battery life, storage space) from the remote microphone device 6. The monitoring device 8 may also output the remote audio signal or the spatially encoded soundtrack themselves via headphones 11. The monitoring device 8 thus allows the user to conveniently monitor various aspects of the recording.

Figure 5:
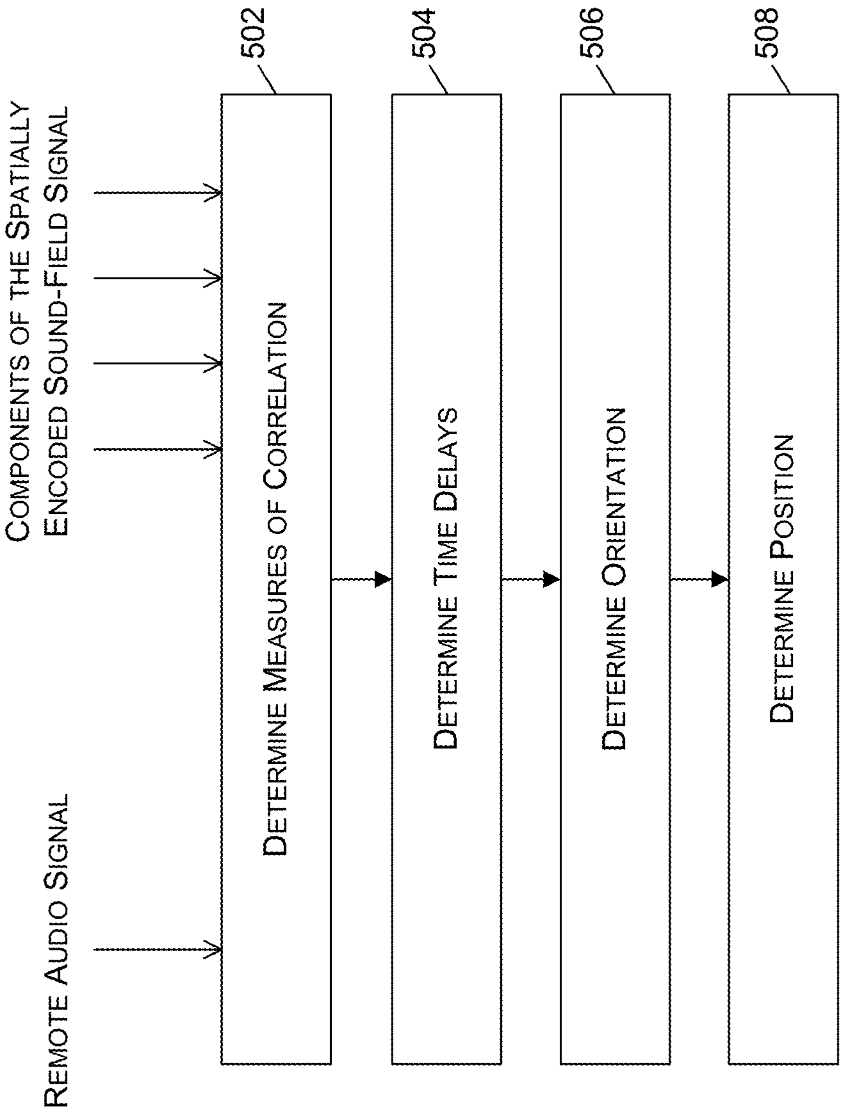
FIG. 5 is a flow chart illustrating one method of position determination.

FIG. 5 shows a flow diagram illustrating one method of determining the position of the remote microphone device 6.

First, the remote audio signal and the plurality of components are subject to a feature extraction process. At step 502 measures of correlation (cross spectra) between the remote audio signal and each of the plurality of components are determined. At step 504, time delays between the microphones of the system are then determined based on these measures. At step 506 an orientation between the remote microphone device 6 and the microphone array 10 is determined using these time delays. Finally, at step 508, a position (in the form of azimuth elevation and distance) is determined based on the determined time delays and the relative magnitude of the determined measures of correlation.

There are several approaches with which the processor 18 (or a separate processing device) may determine the position of the remote microphone device 6, two of which are described in detail for a general case below.

In the first approach, a microphone array consists of q microphones, and outputs a set of ambisonic A-format signals (i.e. the raw output from each microphone) $\hat{s}_q(t)$, each signal including sound from a sound source. A local microphone (e.g. the microphone of the remote microphone device 6) captures a local microphone signal $s_s(t)$ (e.g. the remote audio signal) which corresponds to sound from the sound source.

If it is assumed that the A-format signals consist of I independent sound sources located in a room with reflective walls, the signal of the q-th microphone can be expressed as:

$$\hat{s}_q(t) = \sum_{i=1}^{I} s_i(t) \times h_{i,q}(t) + n_q(t),$$

where $n_q(t)$ is noise, and $h_{i,q}(t)$ is the room impulse response between the i-th source and the q-th microphone. The room impulse response is assumed to consist of L delayed reflections such that:

$$h_{i,q}(t) = \sum_{l=1}^{L} h_{i,q,l}\,\delta(t - \Delta t_{i,q,l}).$$

In the discrete time-frequency Fourier domain, the signal of the q-th microphone at time T can be expressed as:

$$\hat{S}_{q,T}(k) = \sum_{n=0}^{N-1} \hat{s}_q\left(\frac{n}{F_s} + T\right) e^{\frac{-i2\pi kn}{N}} = \sum_{i=1}^{I} S_{i,T}(k) H_{i,q,T}(k) + N_{q,T}(k).$$

$F_s$ is the sampling frequency. The subscript T is omitted for the rest of the description for readability. In order to estimate the position an estimate is made of the time of arrival of the direct sound $\Delta t_{i,q,1}$. The PHAse Transform (PHAT) algorithm is employed on the local microphone signal $S_s(k)$ and the A-format signals $\hat{S}_q(k)$:

$$\Delta t_{s,q,1} = \frac{1}{F_s} \underset{n}{\operatorname{argmax}} \sum_{k=0}^{N-1} e^{i\left(\varphi_{s,q}(k) + \frac{2\pi kn}{N}\right)}$$

$$\varphi_{s,q}(k) = \angle E\{\hat{S}_q(k) S_s(k)^*\} =$$

$$\angle E\left\{\sum_{i=1}^{I} S_i(k) S_s(k) H_{i,q}(k) + N_q(k) S_s(k)^*\right\} \approx \angle H_{s,q}(k) E\{S_s(k) S_s(k)^*\} = \angle H_{s,q}(k)$$

The distance from microphone q to source s, equal to $r_s = c\Delta t_{s,q,1}$, can therefore be estimated, where c is the speed of sound.

Figure 6:
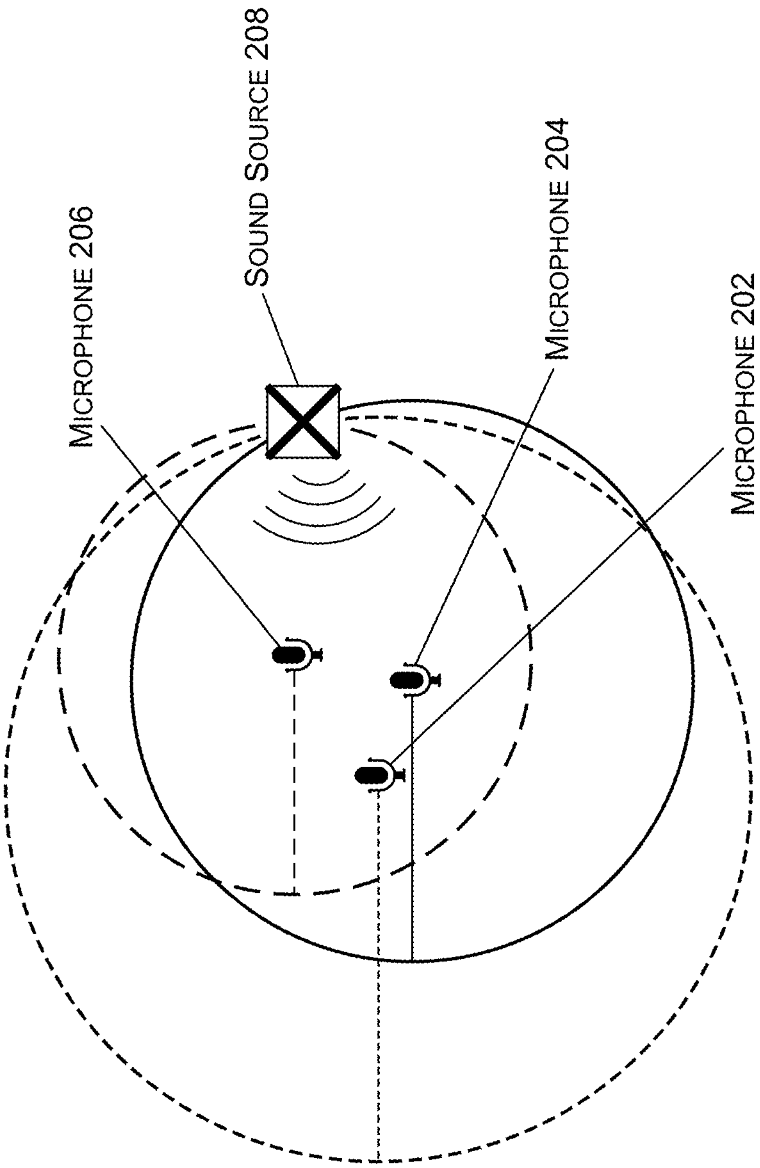
FIG. 6 is a schematic diagram illustrating a simplified trilateration positioning technique.

Once the distances from each of the microphones to the source have been determined, simple algebraic manipulation using these distances along with the positions of the microphones is then all that is required to determine the location of the sound source. FIG. 6 is a simplified diagram demonstrating this process in two-dimensions, although the theory is equally applicable to a full 3D implementation.

FIG. 6 shows the positions of three microphones 202, 204, 206 that make up a microphone array comparable to that illustrated in FIG. 1. A sound source 208 produces sound which is captured by the three microphones 202, 204, 206 as well as a closely positioned local microphone (not shown). Using a method similar to that described above, the distance from each of the three microphones 202, 204, 206 to the sound source is determined. Each of the determined distances defines the radius of a circle, centred on the corresponding microphone, on which the sound source lies. The position of the sound source 208 may be determined by identifying the point at which the three circles coincide.

A second approach for determining the location of a sound source is now described. A microphone array, comprising a plurality of microphones, outputs a set of ambisonic A-format signals, each including sound from a sound source. The A-format signals are processed to produce a set of ambisonic B-format signals, comprising the sound field of the room decomposed into Spherical Harmonics. Each of the B-format signals is labelled $b_n^m(t)$, with m and n labelling the spherical harmonic function. In preferable examples the ambisonic microphone outputs four signals, corresponding to the n=m=0 and n=1 m=−1,0,1 cases. This is conceptually equivalent to A-format signals emanating from an omnidirectional microphone (n=m=1) coincident with 3 orthogonally positioned figure-of-eight microphones (n=1 m=−1,0, 1). In other examples higher order spherical harmonics may be used (increasing the number of B-format signals).

As before, a local microphone captures a local microphone signal $s_s(t)$ which corresponds to sound from the sound source.

Once again I uncorrelated sound sources $s_i$ are modelled in a room with reflective walls. The resulting ambisonic B-format signals in this case can be written as:

$$b_n^m(t) = \sum_{i=1}^{I} s_i(t) \times h_i(t, \theta_i(t), \phi_i(t)) \times Y_n^m(\theta_i(t), \phi_i(t)) + n_n^m(t),$$

where $h_i$ is the room impulse response, $Y_n^m$ are the spherical harmonics and $n_n^m$ represents noise.

The room impulse response, $h_i$, is assumed to consist of L delayed reflections such that:

$$h_i(t, \theta_i(t), \phi_i(t)) = \sum_{l=1}^{L} h_{i,l}\,\delta(t - \Delta t_l).$$

The Fourier transform of the B-format signals can therefore be written as:

$$B_n^m(k) = \sum_{i=1}^{I} S_i(k) \sum_{l=1}^{L} H_{i,l}(k) Y_n^m(\theta_{i,l}, \phi_{i,l}) + N_n^m(k).$$

The cross spectrum between the B-format signal $B_n^m(k)$ and the microphone signal $S_s(k)$, subject to positioning is calculated:

$$E\{B_n^m(k) S_s(k)^*\} = E\left\{\sum_{i=1}^{I} S_i(k) S_s(k)^* \sum_{l=1}^{L} H_{i,l}(k) Y_n^m(\theta_{i,l}, \phi_{i,l}) + N_n^m(k)\right\} =$$

-continued $$E\{S_s(k)S_s(k)^*\}\sum_{l=1}^{L} H_{s,l}(k)Y_n^m(\theta_{i,l},\ \phi_{i,l})$$

Performing an inverse Fourier transform on the cross spectrum produces the ambisonic B-format representation (i.e. decomposed into spherical harmonics) of the room impulse response for the microphone signal convolved with the estimated autocorrelation function for the s'th source, $$R_{ss}(n) = IDFT(E\{S_s(k)S_s(k)^*\}) = \sum_{n=0}^{N-1} E\{S_s(k)S_s(k)^*\}e^{\frac{i2\pi kn}{N}} : IDFT(E\{B_n^m(k)S_s(k)^*\}) = R_{ss}(n) * \sum_{l=1}^{L} h_{s,l}\delta\left(\frac{n}{F_s} - \Delta t_{s,l}\right)Y_n^m(\theta_{s,l},\ \phi_{s,l}).$$

The truncated summation of this ambisonic representation extracts the truncated sum of the direct sound autocorrelation (i.e. excluding any reflections), weighted by the spherical harmonics corresponding to the azimuth and elevation of the source:

$$ds_n^m(s) = \sum_{n=\Delta t_{s,1}F_s - L}^{\Delta t_{s,1}F_s + L} IDFT(E\{B_n^m(k)S_s(k)^*\}) = Y_n^m(\theta_{s,1}, \phi_{s,1})h_{s,1}\sum_{n=-L}^{L} R_{ss}(n) + \sum_{n=\Delta t_{s,1}F_s - L}^{\Delta t_{s,1}F_s + L} R_{ss}(n) * \sum_{l=1}^{L} h_{s,l}\delta\left(\frac{n}{F_s} - \Delta t_{s,l}\right)Y_n^m(\theta_{s,l}, \phi_{s,l}) \approx Y_n^m(\theta_{s,1}, \phi_{s,1})h_{s,1}\sum_{n=-L}^{L} R_{ss}(n)$$

The truncation limit component $\Delta t_{s,1}$ can be extracted in the same manner as for the A-format signals; by employing the PHAT algorithm on the local microphone signal and $b_0^0(t)$ (the omnidirectional B-format component). L is assumed to be smaller than $$\frac{\Delta t_{s,2} - \Delta t_{s,1}}{2} F_s$$

and chosen so that $\Sigma_{n=0}^{L} R_{ss}(n) >> \Sigma_{n=L+1}^{N} R_{ss}(n)$.

The source direction (azimuth and elevation) relative the ambisonic microphone can be extracted by evaluating the components of $ds_n^m$ as below:

$$\begin{bmatrix} Y_1^{-1}(\theta, \phi) \\ Y_1^0(\theta, \phi) \\ Y_1^1(\theta, \phi) \end{bmatrix} = C \begin{bmatrix} \sin(\phi)\cos(\theta) \\ \sin(\theta) \\ \cos(\phi)\cos(\theta) \end{bmatrix}$$

$$\therefore \phi_{s,1} = \begin{cases} \tan^{-1}\left[\dfrac{ds_1^{-1}(s, t)}{ds_1^1(s, t)}\right] & \text{for } ds_1^{-1}(s) \geq 0, \\ \tan^{-1}\left[\dfrac{ds_1^{-1}(s)}{ds_1^1(s)}\right] - 180^\circ & \text{for } ds_1^{-1}(s) < 0, \end{cases}$$

$$\phi_s = \tan^{-1}\left[\frac{ir_1^0(s, t)}{\sqrt{ir_1^1(s, t)^2 + ir_1^{-1}(s, t)^2}}\right].$$

In order to fully define the position of the sound source, the distance (or range) from the microphone array to the sound source must also be determined. This may be calculated using $r_s = \Delta t_{s,1}c$, where c is the speed of sound.

The particular embodiments described above are merely exemplary and many possible variants and modifications are envisaged within the scope of the invention as defined in the claims.

The invention claimed is:

1. A sound capture apparatus comprising:

a base unit comprising a microphone array arranged to capture a plurality of local audio signals for producing a spatially encoded sound-field signal;

a remote microphone device comprising a microphone and an associated storage portion, wherein the remote microphone device is arranged to capture a remote audio signal associated with a sound source with the microphone and store said remote audio signal in the associated storage portion;

wherein the apparatus is arranged to:

use the plurality of local audio signals to produce the spatially encoded sound-field signal comprising a plurality of components;

determine a position of the remote microphone device; and generate a spatially encoded soundtrack using the spatially encoded sound-field signal and the stored remote audio signal in accordance with the determined position of the remote microphone device, wherein the base unit and the remote microphone device are arranged to communicate over a wireless link, and further wherein the remote microphone device is arranged to transmit the stored remote audio signal or a supplementary signal derived from the stored remote audio signal from the remote microphone device to the base unit over the wireless link.

2. The sound capture apparatus of claim 1, arranged to determine the position of the remote microphone device by comparing said remote audio signal with the plurality of components of the spatially encoded sound-field signal.

3. The sound capture apparatus of claim 1, wherein the remote microphone device is arranged to transmit a version of the remote audio signal from the remote microphone device to the base unit over the wireless link.

4. The sound capture apparatus of claim 1, arranged to use one or more properties of signals transmitted over the wireless link to determine the position of the remote microphone device.

5. The sound capture apparatus of claim 1, wherein the base unit comprises a processor, and the processor is arranged to determine the position of the remote microphone device and to generate the spatially encoded soundtrack using the spatially encoded sound-field signal and the remote audio signal in accordance with the determined position of the remote microphone device.

6. The sound capture apparatus of claim 1, comprising a separate processing device arranged to determine the position of the remote microphone device; and generate the spatially encoded soundtrack using the spatially-encoded audio signal and the remote audio signal in accordance with the determined position of the remote microphone device.

7. The sound capture apparatus of claim 1, wherein the remote microphone device and base unit are arranged to form a temporary wired connection and the remote microphone device is arranged to transfer the stored remote audio signal or a supplementary signal derived from the stored remote audio signal to the base unit over said temporary wired connection.

8. The sound capture apparatus of claim 1, wherein said associated storage portion comprises a removable storage device.

9. The sound capture apparatus of claim 1, further comprising a monitoring device arranged to output information relating to the remote audio signal or the spatially encoded sound-field signal to a user.

10. The sound capture apparatus of claim 1, arranged to process automatically the remote audio signal based at least partially on the determined position of the remote microphone device.

11. The sound capture apparatus of claim 1, arranged to suppress sound from the sound source appearing in the spatially encoded sound-field signal produced by the microphone array.

12. The sound capture apparatus of claim 1, wherein the spatially encoded soundtrack comprises a separate audio channel for the remote audio signal.

13. The sound capture apparatus of claim 1, comprising a plurality of remote microphone devices, each comprising a microphone and an associated storage portion, wherein the plurality of remote microphone devices are arranged to capture a corresponding plurality of remote audio signals and wherein the apparatus is arranged to:

determine a position of each remote microphone device; and generate the spatially encoded soundtrack using the remote audio signals in accordance with the determined positions of the remote microphone devices.

14. The sound capture apparatus of claim 13, arranged to process the remote audio signals to remove cross talk.

15. A sound capture apparatus comprising:

a base unit comprising a microphone array arranged to capture a plurality of local audio signals for producing a spatially encoded sound-field signal;

a remote microphone device comprising a microphone and an associated storage portion, wherein the remote microphone device is arranged to capture a remote audio signal associated with a sound source with the microphone and store said remote audio signal in the associated storage portion;

wherein the apparatus is arranged to:

use the plurality of local audio signals to produce the spatially encoded sound-field signal comprising a plurality of components;

determine a position of the remote microphone device; and generate a spatially encoded soundtrack using the spatially encoded sound-field signal and the stored remote audio signal in accordance with the determined position of the remote microphone device, wherein the base unit comprises a processor, and the processor is arranged to determine the position of the remote microphone device and to generate the spatially encoded soundtrack using the spatially encoded sound-field signal and the remote audio signal in accordance with the determined position of the remote microphone device.

16. A sound capture apparatus comprising:

a base unit comprising a microphone array arranged to capture a plurality of local audio signals for producing a spatially encoded sound-field signal;

a remote microphone device comprising a microphone and an associated storage portion, wherein the remote microphone device is arranged to capture a remote audio signal associated with a sound source with the microphone and store said remote audio signal in the associated storage portion; and a separate processing device arranged to determine the position of the remote microphone device and generate a spatially encoded soundtrack using the spatially-encoded sound-field signal and the remote audio signal in accordance with the determined position of the remote microphone device;

wherein the apparatus is arranged to:

use the plurality of local audio signals to produce the spatially encoded sound-field signal comprising a plurality of components;

determine a position of the remote microphone device; and generate a spatially encoded soundtrack using the spatially encoded sound-field signal and the stored remote audio signal in accordance with the determined position of the remote microphone device.

* * * * *